Feb. 26, 1935.  W. F. TRAUDT  1,992,261

PULP OR FIBROUS MASS BREAKER

Filed Oct. 12, 1933

INVENTOR.
William F. Traudt
by Parker, Prochnow & Farmer
ATTORNEYS.

Patented Feb. 26, 1935

1,992,261

UNITED STATES PATENT OFFICE 1,992,261

PULP OR FIBROUS-MASS BREAKER

William F. Traudt, Buffalo, N. Y.

Application October 12, 1933, Serial No. 693,297

3 Claims. (Cl. 259—95)

This invention relates to improvements in breakers or disintegrators for fibrous material, such as the filter-mass employed in breweries for filtering beer, the breaker of this application being primarily intended for breaking up the soiled or used filter-mass coming from the beer filters preparatory to washing or reclaiming it for reuse.

In finishing beer it is usual to filter it to remove the yeast, bacteria and other particles therefrom in order to produce clear, brilliant beer. The filtering material commonly used is a fibrous mass known as "filter-mass" which is packed in the beer filter and, after use in the filter press, in which it becomes compressed or packed and clogged with impurities from the beer, it is broken up and washed to remove the impurities and restore the mass to a condition fit for reuse. It is essential to the proper and efficient filtration of the beer that the filter mass used shall be a fluffy, or more or less loose homogeneous mass, free from knots or balls, which form in the filter-mass in reclaiming it, unless it is thoroughly disintegrated and the fibers separated. These knots or balls prevent proper filtering of the beer because they are so compact as not to be readily pervious to the liquid, and they leave relatively large spaces or crevices between them through which the impurities can pass with the liquid, so that the impurities are not thoroughly removed as they would be by using filter-mass having only the microscopic interstices between the separate fibers of properly conditioned fiber-mass.

Specific objects of this invention are to produce an efficient, economical device for the purpose mentioned; also to provide a filter-mass breaker by which the packed or caked filter-mass removed from the filter after use, can be thoroughly broken up or disintegrated and prevented from becoming knotted or balled; and also to provide a filter-mass breaker which also serves as a means for conveying or delivering the broken or disintegrated filter-mass to the washer by which it is cleansed or renovated.

Figure 1:
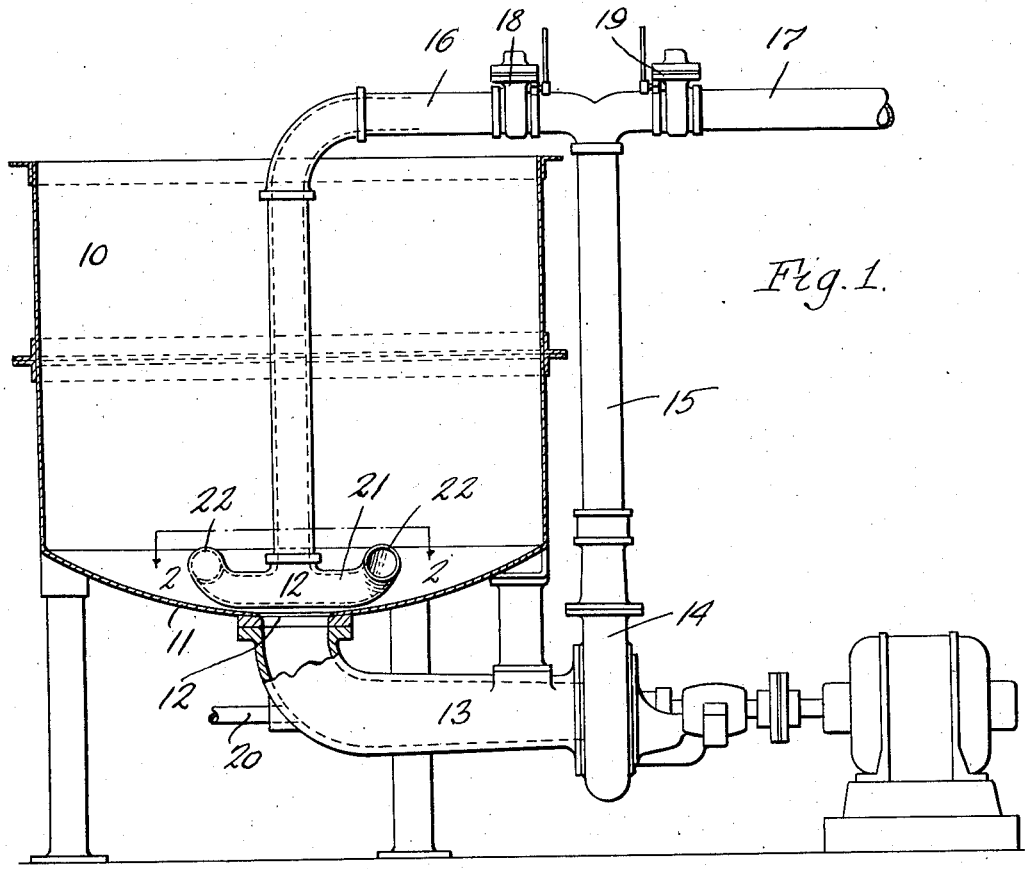
Fig. 1 is an elevation, partly in section, of a filter-mass breaker embodying my invention.
Figure 2:
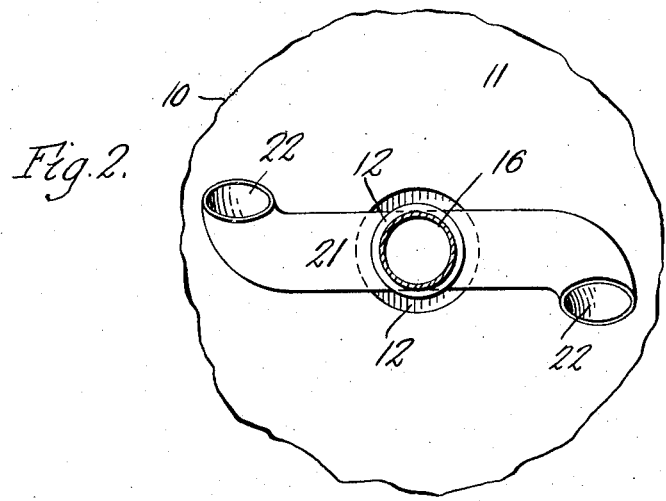
Fig. 2 is a fragmentary, sectional plan view thereof on line 2—2, Fig. 1.

The breaker, which is preferably installed adjacent the beer filter, comprises a vat or receptacle 10, which may be of horizontal, circular cross section having a dished or depressed bottom 11 with a central outlet 12 from which a suction pipe 13 leads to the intake of a pump 14, which, as shown, is a centrifugal pump driven by an electric or other suitable motor. The discharge pipe 15 of the pump has a branch 16 which extends into the vat, preferably centrally downward therein, and a second branch 17, which leads away from the breaker to the filter-mass washer (not shown). These branches are valve-controlled, as by gate valves 18 and 19 respectively in the branches 16 and 17, so that by opening the valve 18 and closing the valve 19, the water and fibrous material with which the vat is partially filled, can be pumped therefrom and returned thereto by the pump, the mixed water and material thus being repeatedly recirculated through the vat and pump, while by closing the valve 18 and opening the valve 19, the water and material can be withdrawn by the pump from the vat and delivered through the branch pipe 17 to the washer or other desired distant point. Water may be supplied to the vat in any convenient way, such as by a water pipe 20 connecting with the pump suction pipe 13.

At its lower or discharge end, the branch 16 of the discharge pipe is provided with a discharge head or nozzle 21, preferably located over and adjacent to the central bottom outlet 12 of the vat, and formed with one or more discharge orifices arranged so as to discharge upwardly and laterally, or obliquely upwards in the vat. In its preferred form, the head has two discharge nozzles 22 projecting to opposite sides of the discharge pipe and curved upwardly and laterally in opposite directions. The water and fibrous material mixed therewith are thus discharged from these nozzles upwardly and in laterally opposite directions in the vat, and thus produce a compound motion and a very active agitation or turbulence in the body of water and filter-mass in the vat, such as to very thoroughly break up the material.

In the use of the device, the vat is partly filled with water and the pump started to circulate the water through and cause the described agitation thereof in the vat, and the used filter-mass from the filter is thrown into the water until the vat is sufficiently charged, and the circulation and agitation of the mixed water and material is continued until the filter-mass is thoroughly broken up.

The discharge from the head or nozzles formed and disposed as described produces motion in the fluid body in the vat in different planes, in a way to cause violent turbulence, eddying or swirling thereof, and very efficiently break up or disintegrate the filter-mass. The action or motion of the liquid in the vat is very different from a rotary or rolling motion in one plane, such as would be produced by a horizontal, tangential or vertically directed jet, and the compound motion or agitation of the liquid described effectively prevents the fibrous material from collecting or forming in balls or knots, and thus insures a thorough and uniform breaking up and separation of the fibers of the mass.

When the proper breaking up or disintegration of the mass has been accomplished, the valve 18 is closed and the valve 19 opened, and then by the continued operation of the pump the mixture of water and disintegrated fibrous material is withdrawn from the vat and discharged through the pipe 17, which thus serves to convey the material, without handling, to the washer, in which the material is washed or treated to remove the impurities therefrom, and complete its reclamation.

I claim as my invention:

1. A fibrous-mass breaker comprising a vat adapted to contain water and the fibrous-mass and having a central bottom outlet with an unobstructed passage large enough for the free flow of the solid fibrous material with the water therethrough, a pump having a suction pipe connected with the vat outlet and a discharge pipe delivering into the vat said pump and suction and discharge pipes being constructed for circulating the mixed water and solid fibrous material through said pipes, pump and vat, said discharge pipe being provided with a discharge head submerged in the liquid mixture and located over and adjacent the bottom outlet of the vat, and having discharge nozzles directed outwardly and upwardly to discharge obliquely upward in opposite directions in the mixture in the vat.

2. A fibrous-mass breaker comprising a vat adapted to contain water and the fibrous mass and having an outlet with an unobstructed passage large enough for the free flow of the solid fibrous material with the water therethrough, a pump having a suction pipe connected with the vat outlet, and a discharge pipe delivering into the vat said pump and suction and discharge pipes being constructed for circulating the mixed water and solid fibrous material through said pipes, pump and vat, said discharge pipe having a discharge orifice in the lower portion of the vat and submerged in the liquid mixture and formed to discharge into the body of water in the vat in a direction oblique both to the horizontal and the vertical to produce motion of the body of water in different planes and thereby effect an active agitation of the mixed water and fibrous material.

3. A fibrous-mass breaker comprising a vat of approximately circular horizontal section adapted to contain water and the fibrous-mass and having a central bottom outlet adapted for the passage of the solid fibrous material, a pump having a suction pipe connected with said bottom outlet and a discharge pipe extending down centrally in the vat, said pump and suction and discharge pipes being constructed for circulating the mixed water and solid fibrous material through said pipes, pump and vat, said discharge pipe being provided at its lower end with a discharge head submerged in the liquid mixture and located over and adjacent the bottom outlet of the vat and having discharge nozzles extending obliquely upward and laterally in opposite directions in the vat.

WILLIAM F. TRAUDT.